United States Patent

[11] 3,584,308

[72] Inventor Franklin D. Neu
Richmond, Calif.
[21] Appl. No. 832,249
[22] Filed June 11, 1969
[45] Patented June 8, 1971
[73] Assignee The United States of America as represented by the United States Atomic Energy Commission

[54] BIDIRECTIONAL LOGIC CIRCUITS EMPLOYING DUAL STANDARD ARRAYS OF BISTABLE MULTIVIBRATORS
7 Claims, 4 Drawing Figs.

[52] U.S. Cl. .......... 328/37, 328/44, 307/221
[51] Int. Cl. .......... G11c 19/00
[50] Field of Search .......... 307/221; 328/37, 44

[56] References Cited

UNITED STATES PATENTS

| | | | |
|---|---|---|---|
| 3,274,566 | 9/1966 | McGrogan .......... | 328/37 X |
| 3,348,069 | 10/1967 | Petschauer .......... | 328/37 X |
| 3,421,092 | 1/1969 | Bower et al. .......... | 328/37 |
| 3,508,212 | 4/1970 | Ault .......... | 307/221 X |

*Primary Examiner*—John S. Heyman
*Attorney*—Roland A. Anderson

ABSTRACT: A bidirectional shift register or counter that is a composite of two standard serial arrays of bistable multivibrator elements wherein the outputs of each element of each array are directly connected to the outputs of the corresponding element in the other array; and the arrays are arranged to be actuated to move values in opposite directions. Only one array at a time is supplied with a shift or count pulse so that corresponding elements of each array, because of their interconnections, are always set to the same value. The values in both arrays, therefore, may be moved in either direction depending on which array is actuated with a shifting or counting pulse.

PATENTED JUN 8 1971

3,584,308

SHEET 1 OF 3

INVENTOR.
FRANKLIN D. NEU

BY

ATTORNEY

INVENTOR
FRANKLIN D. NEU
BY
[signature]
ATTORNEY

INVENTORS
MARVIN I. GLASS
GUNARS LICITIS

BY James F. Coffee
ATTORNEY

BIDIRECTIONAL LOGIC CIRCUITS EMPLOYING DUAL STANDARD ARRAYS OF BISTABLE MULTIVIBRATORS

BACKGROUND OF THE INVENTION

The present invention relates to multidirectional logic circuits, and more particularly, it relates to composite arrays of standard bistable multivibrator elements arranged as bidirectional registers and counters.

Known right-left shift registers and up-down counters are comprised of a plurality of bistable elements interconnected with extensive logic gating circuitry that enables ordinal movement of values in two directions. Such logic gating circuitry is expensive, complex, takes up space and makes multidirectional logic arrays impractical.

SUMMARY OF THE INVENTION

In brief, the present invention relates to a simple and economical interconnection of standard bistable multivibrator elements into bidirectional logic circuits such as left-right shift registers or up-down counters in which no logic gating circuitry beyond a standard bistable element is used. A bidirectional logic circuit of the present invention is comprised of two standard serial arrays of bistable elements. One array is connected for movement of values in a first direction and the other array is connected for movement of values in a second direction. The number of elements in each array is equal, and each element in each array has complementary ordinal correspondence with an element of the other array. The outputs of the corresponding elements are connected directly together so that corresponding elements are always set to the same value or state. Thus, as values are moved in the first direction in the first array by application to the array of a shifting or counting pulse, the second array is set to the same value by virtue of the interconnection of outputs. No shifting or counting pulses are applied to the second array, thereby leaving it free to assume or "follow" the value of the first array. Movement of the value in the opposite or second direction is achieved by applying a shifting or counting pulse to the second array but not to the first. Thus, the value in the first array "follows" the value in the second and both are moved in the second direction. Such bidirectional logic circuits may be simply and inexpensively constructed solely of standard bistable multivibrator elements. Furthermore, the simplicity, reduced cost, and minimal space requirements of such circuits makes large multidirectional arrays of bidirectional shift registers and counters practical for use in random signal generators and in computer coding units such as used for aircraft identification security systems. Such arrays may also be used in signal correlation units for handling complex arithmetical operations such as Fourier transforms.

It is an object of the invention to eliminate logic gating circuitry in bidirectional logic circuits such as left-right shift registers and up-down counters.

Another object is to simply fabricate bidirectional shift registers and counters using only standard bistable multivibrator elements.

Another object is to reduce the cost and size of bidirectional logic circuits.

Another object is to simply and economically fabricate multidirectional shifting or counting units.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
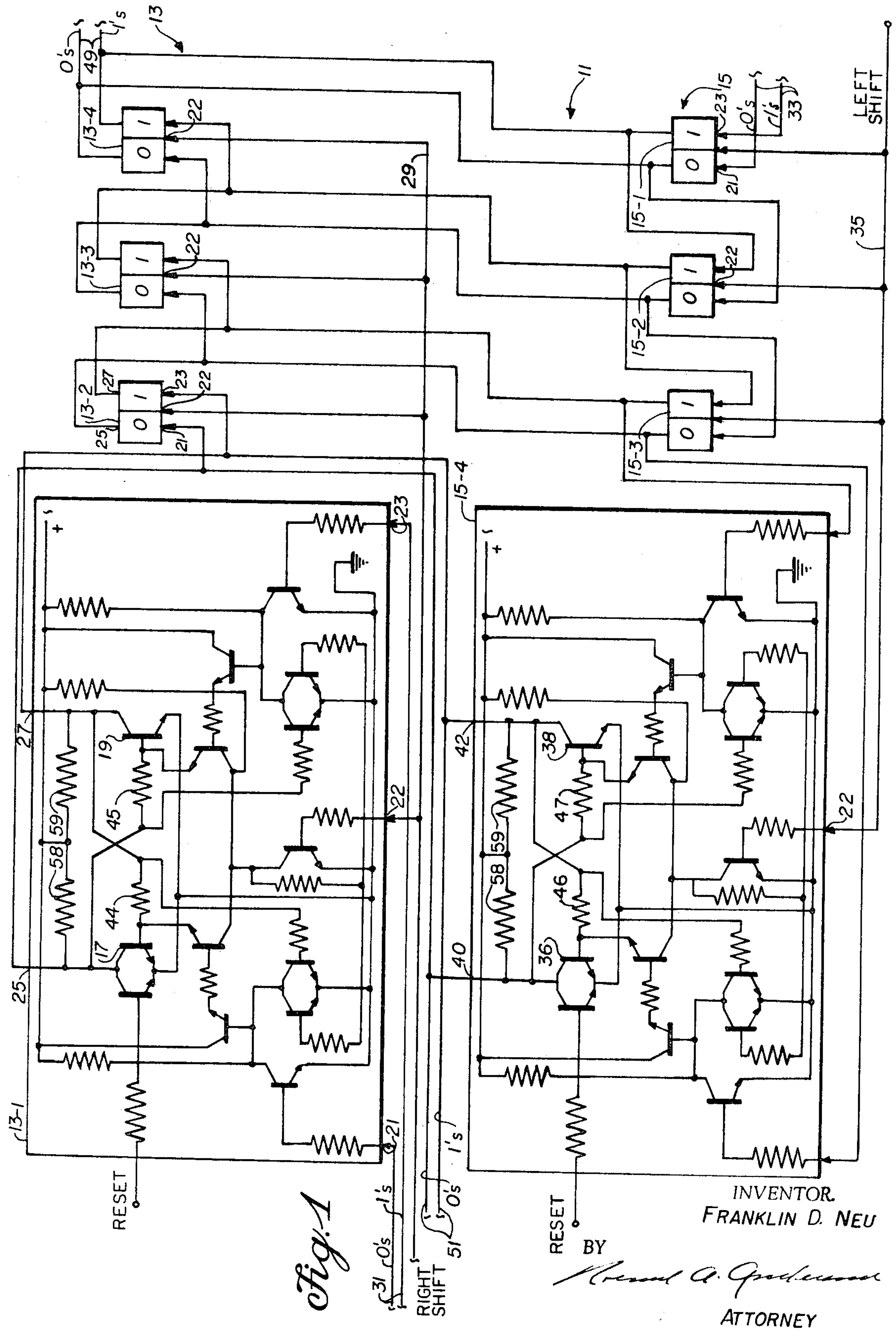
FIG. 1 is a diagram of a left-right shift register comprised of dual arrays of bistable multivibrator elements, including a schematic diagram of a standard bistable element of one of the elements in each array, and further showing the direct interconnections between the outputs of corresponding elements in each array according to the invention.

Referring to FIG. 1 there is shown a left-right shift register 11 comprised of a right shift register 13 and a left shift register 15. The right shift register 13 includes an array of bistable multivibrator or flip-flop elements 13–1 through 13–4, and the left shift register 15 includes an array of bistable multivibrator elements 15–1 through 15–4. The bistable elements in each of the arrays may be either of the tube type or the transistorized type and may be identical and of any standard unbuffered output type such as the JK type of flip-flop described by Montgomery Phister, Jr., "Logical Design of Digital Computers," John Wiley and Sons, 1958, pg. 128. A specific circuit diagram of a standard JK-type transistorized flip-flop having an unbuffered output that was used in a specific embodiment of the invention is shown as the bistable multivibrator element 13–1 in the lowest ordinal position of the right shift register 13. An identical bistable element 15–4 is shown in the highest ordinal position of the left shift register 15. The bistable element 13–1 includes two active components, transistors 17 and 19, only one of which can be conducting at a time. The condition of the element 13–1 may be arbitrarily designated as in the "zero" state when the transistor 17 is nonconducting and in the "one" state when the transistor 19 is nonconducting. The presence of a positive signal level at a zero input terminal 21 and a low signal level at a one input terminal 23 in coincidence with a positive rising shift pulse applied to a shift terminal 22 causes the transistor 17 to become nonconducting and the transistor 19 to conduct. This state is ensured, in the conventional way, by cross connections from the base of each transistor 17 and 19 to the collector of the other transistor. Similarly, a positive signal level applied to the one input terminal 23 and a low signal level applied to the zero input terminal 21 in coincidence with a shift pulse applied to the terminal 22 ensures that the element 13–1 is in its one state, with the transistor 19 nonconducting and the transistor 17 conducting.

With the transistor 17 in its nonconducting state, a high potential is applied from its collector to a zero output terminal 25 which is connected to the zero input terminal 21 of the next higher bistable element 13–2 and a low potential is applied from the collector of the transistor 19 to a "one" output terminal 27 to the one input terminal of element 13–2. The element 13–2 is prepared to be set to the zero state upon a right shift pulse being applied to the shift terminal 22. Similarly with the bistable element 13–1 set to its one state, i.e., with the transistor 19 nonconducting, a high potential is applied from the collector of the transistor 19 through the one output terminal 27 to the one input terminal 23 of the element 13–2, along with a low potential applied to the zero input terminal 21 from the collector of the transistor 17. The element 13–2 is thereby prepared to be set to its one state upon the occurrence of a shift pulse at the terminal 22.

All of the shift terminals 22 of the bistable elements of the register 13 are connected together to a right shift line 29. Data signals applied to data input terminals 31 and hence to the zero and one input terminals 21 and 23 of the element 13–1 in synchronism with shifting pulses applied to the line 29 causes the element 13–1 to assume successive states corresponding to the input data and to shift the data one ordinal position rightward upon the occurrence of each successive shift pulse.

In a similar manner data may be applied to the left shift register 15 at data input terminals 33 for application to the input terminals 21 and 23 of the bistable element 15–1. A left shift line 35 is provided for applying shift pulses to each of the shift terminals 22 of the bistable elements of the register 15 in coincidence with the data at the input terminal 33. Data thereby may be entered at the input terminals 33 and shifted leftward in a manner similar to that described with respect to the register 13.

The bistable elements comprising the register 15 may be identical with those of the register 13, such as the standard JK circuit having an unbuffered output shown for the element 15–4 which includes a pair of transistors 36 and 38 for producing a "zero" output at a "zero" output terminal 40 and a "one" output terminal 42.

The main feature of the invention is the interconnection between the outputs of the bistable elements that have complementary ordinal correspondence in the registers 13 and 15. For example, the outputs 25 and 27 of the lowest ordinal element 13–1 of the register 13 are connected to the outputs 40 and 42 of the highest ordinal element 15–4 of the register 15, while the outputs of the element 13–4 are connected to the outputs of the lowest ordinal element 15–1 of the register 15. The outputs of the other corresponding elements in each register are similarly interconnected. By virtue of these connections the corresponding elements will always be set to the same state through the standard cross connections within each bistable element. For example, in the circuit 13–1 the collector of the transistor 17 is connected to the base of the transistor 19 through a resistor 45, while the collector of the transistor 19 is coupled to the base of the transistor 17 through a resistor 44. Correspondingly, in the circuit 15–4 the collector of the transistor 36 is coupled to the base of the transistor 38 by means of a resistor 47 while the collector of the transistor 38 is coupled to the base of the transistor 36 through a resistor 46. With the element 13–1 in its zero state, the transistor 19 is conducting and the transistor 17 is nonconducting. Consequently, a high potential appears at the terminal 25 while a low potential appears at the output 27. These high and low output potentials are applied to corresponding output terminals 40 and 42 of the circuit 15-4. A high potential is thereby applied from the terminal 40 through the resistor 47 to the base of the transistor 38, while a low potential is applied from the terminal 42 through the resistor 46 to the base of the transistor 36. These potentials ensure that the element 15–4 is in its zero state with the transistor 38 conducting and the transistor 36 nonconducting. Similarly, with the element 13–1 in its one state, the cross connections ensure that the element 15–4 is in its one state. The circuits 13–1 and 15–4 are thereby maintained in identical states at all times. The interconnections of the outputs of the other corresponding elements ensures, in a similar manner, that all corresponding elements are always in the same state.

During a condition in which data is being shifted into one of the registers 13 or 15, for example the register 13, data signals are applied to the input terminals 31 and data is shifted into the register in correspondence with shift pulses applied to the right shift line 29. During such an operation, no shift pulses are applied to the left shift line 35. This leaves each of the elements in the register 15 free to follow, i.e., assume the state of, the corresponding element in the register 13 by virtue of the interconnections of the respective outputs of corresponding elements. Similarly, data that is applied to the input terminals 33 of the left shifting register 15 in correspondence with left shifting pulses applied t the left shift line 35 is shifted leftward into the register 15, in a direction opposite to the direction in which data was shifted into the register 13. Since no shifting pulses are applied to the right shift line 29 under these conditions the bistable elements of the register 13 are free to follow and thereby assume the identical states of the corresponding elements in the register 15 to which their outputs are interconnected.

Thus, by interconnecting the registers 13 and 15 in the manner described, a right-left shift register is obtained in which data may be shifted rightward by application of data to the input terminals 39 in correspondence with application of shifting pulses to the line 29; and conversely, data may be entered in to the register 15 and shifted leftward by application of data pulses to the line 33 in correspondence with shifting pulses applied to the line 35.

Figure 2:
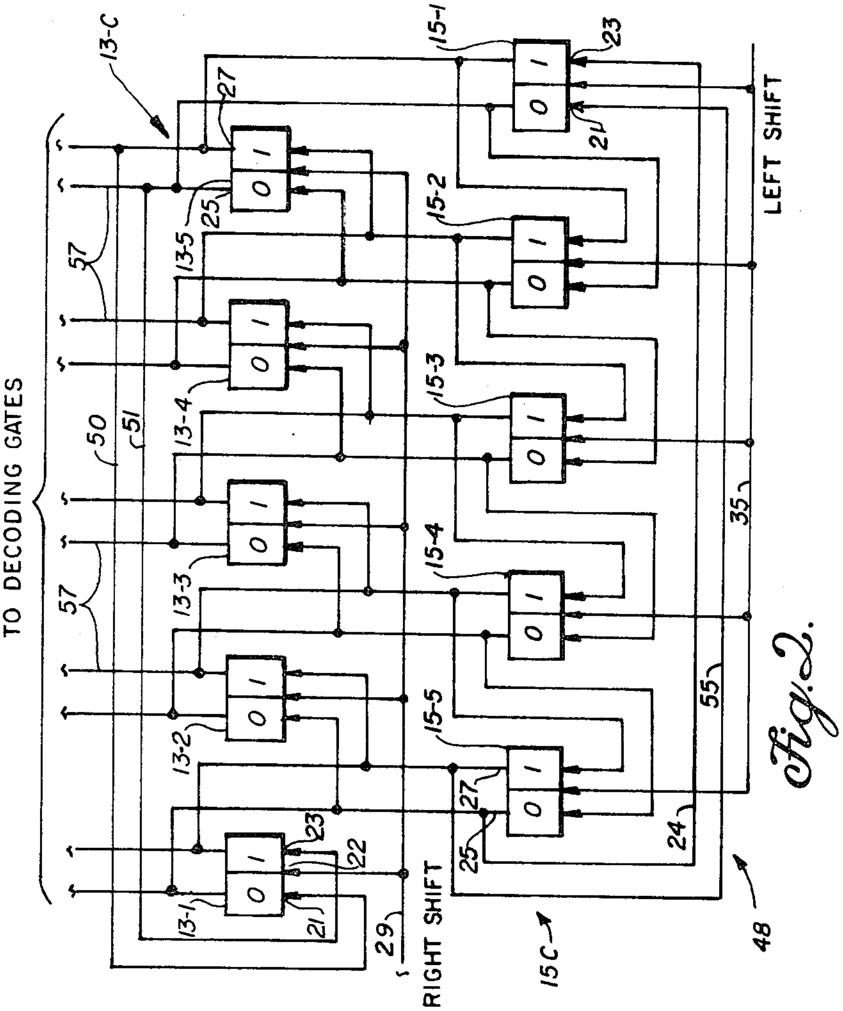
FIG. 2 is a block diagram of a switch-tail up-down decimal counter comprised of two standard arrays of bistable multivibrator elements with the outputs of corresponding elements in each array interconnected according to the invention.

In addition to left-right shift registers, the invention also results in simplified up-down counters. For example, a switch-tail up-down decimal counter 48 is shown in FIG. 2. The counter 48 may be fabricated by minor modification of the left-right shift register 11 (FIG. 1). For example, a 10 position switch-tail up counter 13–C may be formed by adding an additional bistable element 13–5 to the register 13, connecting the one output 27 of the highest order bistable element 13–5 over a lead 50 to the zero input 21 of the lowest bistable element 13–1, and by connecting the zero output from terminal 25 of the element 13–5 over a lead 51 to the one input terminal 23 of the lowest order element 13–1. With all the elements of the counter 48 reset to their zero condition, the pulses to be counted may be applied to the right shift line 29. Successive count pulses applied to the line 29 cause the elements 13–1 through 13–5 of the register 13–C to successively assume the states shown in Table I.

TABLE I.—STATE OF ELEMENTS OF COUNTER 13–C

| | 13–1 | 13–2 | 13–3 | 13–4 | 13–5 |
|---|---|---|---|---|---|
| Decimal count: | | | | | |
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 9 | 0 | 1 |

Decoding of the counter may be accomplished in a conventional manner by running the zero and one outputs from each element to output terminals 57 and hence to decoding gates (not shown) for obtaining a single output signal for each decimal count.

Similarly, the counter 15 may be modified to form a 10 position switch-tail down counter 15–C, by adding an element 15–5, connecting the zero output 25 of the element 15–5 over a lead 24 to the one input terminal 23 of the element 15–1, and connecting the one output terminal 27 of the element 15–5 over a lead 55 to the zeros input terminal 21 of the element 15–1. The down counter 15–C may be used to count in the same manner as discussed with respect to the up counter 13–C but in a direction opposite to that of 13–C. The bistable elements of the counters 13–C and 15–C that have complementary ordinal correspondence have their outputs interconnected in a manner similar to the interconnections between the registers 13 and 15 of the left-right shift register 11. The corresponding elements of each array are therefore always set to the same condition. This enables the composite counter 48 to be used as an up-counter when count pulses are applied to shift line 29 and as a down-counter when count pulses are applied to the left shift line 35. Each of the outputs of the elements of counter 15–C is connected to the output terminals 57 by virtue of interconnections between the outputs of corresponding bistable elements of the counters 13–C and 15–C. The described arrangement results in an up-down counter that is comprised of two arrays of standard bistable multivibrator components formed into respective up and down counters that require no gating beyond the standard bistable element, thereby eliminating the extensive gating required in known up-down counters.

With the elimination of extensive gating for bidirectional logic circuits, multidirectional units of intersecting bidirectional logic circuits are made economically practical Furthermore there appears to be no theoretical limitation as to the number of arrays that may be intersected provided the proper load resistance is shared. The load resistance in each of the circuits 13–1 and 15–4 is comprised of a pair of resistors 58 and 59. Conveniently, such sharing may be accomplished by removing the load resistance in all of the intersecting stages but one. Multidirectional arrays comprised of a number of bidirectional shift registers as basic building blocks may find use as random signal generators, or as signal correlation units associated with a computer for obtaining complex arithmetic Fourier transforms, or as security coding units coupled to a computer for aircraft identification.

Figure 3:
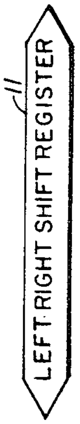
FIG. 3 is a symbolic representation of a left-right shift register such as shown in FIG. 1.
Figure 4:
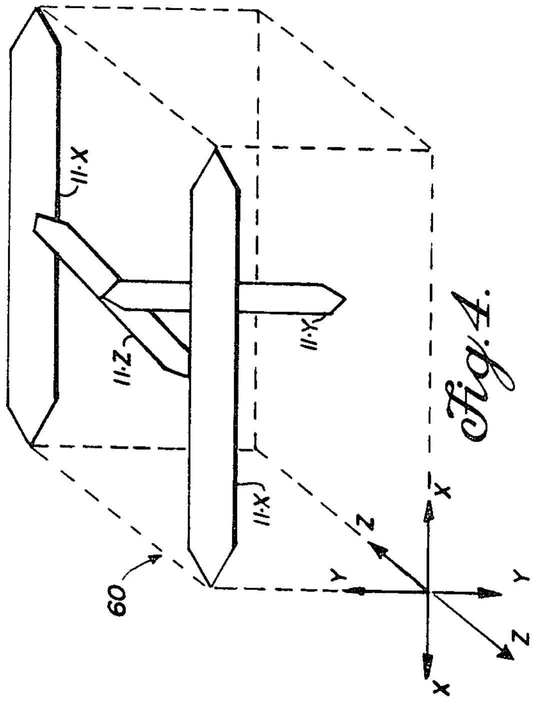
FIG. 4 is a symbolic representation of a three-dimensional shift register comprised of bidirectional shift registers, such as shown in FIG. 1 and represented in FIG. 3, with the outputs of each stage of each bidirectional register interconnected at intersecting points, and with the load resistors removed in all but one of the intersecting stages.
Figure 5:
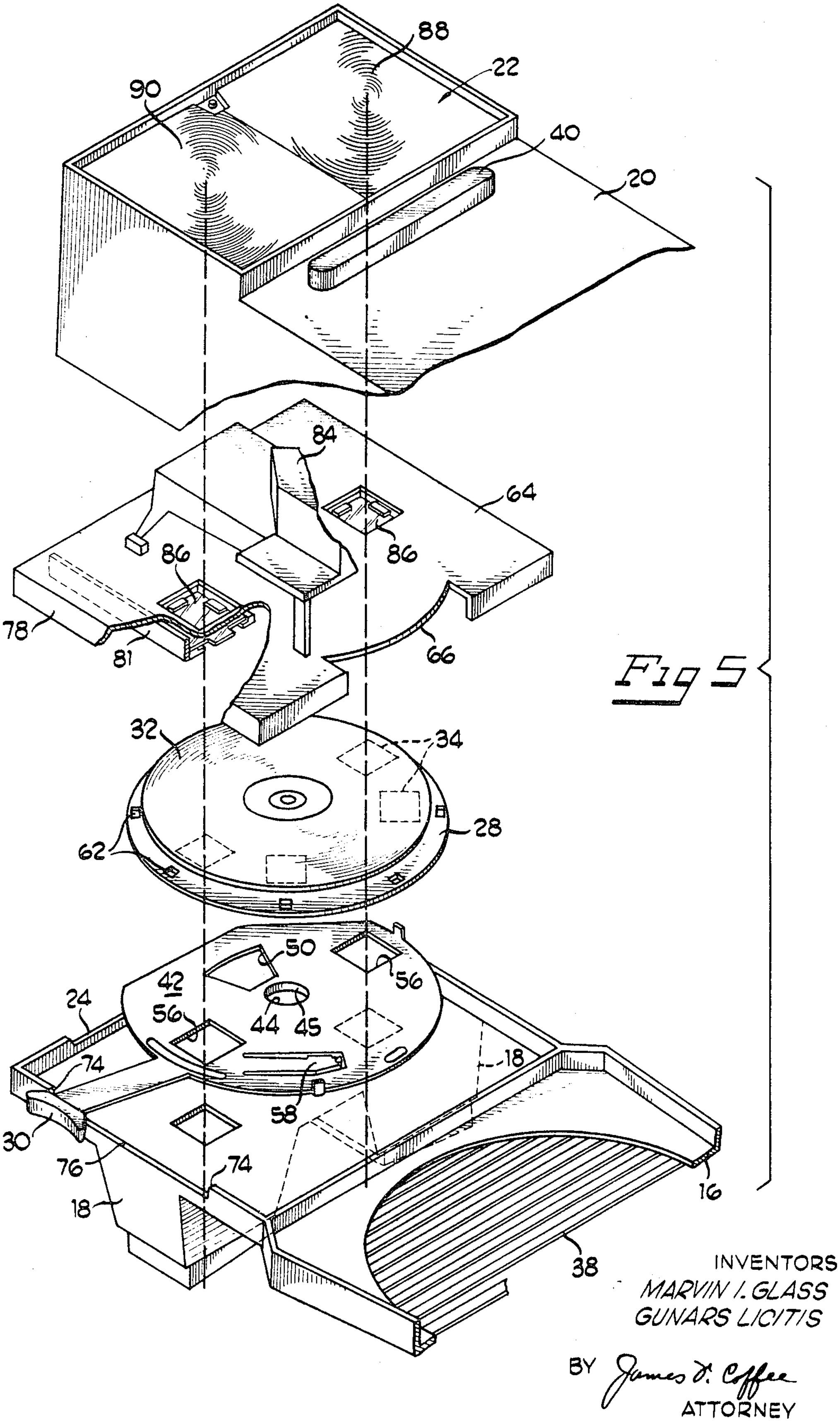

The left-right shift register 11 of FIG. 1 may be used as a basic building block and for convenience of explanation is shown symbolically in FIG. 3. In FIG. 4, a multidirectional logic unit 60 is shown symbolically as being comprised of a number of shift registers 11 arranged in planes and then stacked in three directions that may be designated as X–X, Y–Y and Z–Z. For example, a number of registers 11–X may be arranged in parallel planes so that each register shifts in the X–X direction; these planes are stacked in the Y–Y direction. Other registers may be similarly arranged in respective parallel planes for shifting in the Y–Y and Z–Z directions with the planes stacked in the Z–Z and Y–Y directions respectively. In the unit 60 each order of each register in each dimension intersects with an order of a register in each of the other two dimensions. The one and zero outputs of the intersecting registers are connected together and therefore are invariably in the same condition, each intersection thereby defining single discrete positions in the unit 60. By selective pulsing of the shift lines of the registers 11, a value may be entered into the unit and shifted to a predetermined position in the unit 60 for coding or correlation; or alternatively, a value may be shifted randomly to generate random output signals.

While an embodiment of the invention has been shown and described, further embodiments or combinations of those described therein will be apparent to those skilled in the art without departing from the spirit of the invention.

I claim:

1. A bidirectional logic circuit comprising:

a. a first array of bistable elements serially connected for movement of values in a first direction, each of said elements in said first array having first and second unbuffered outputs;

b. a second array of bistable elements serially connected for movement of values in a second direction, each of said elements in said second array having first and second unbuffered outputs, and each of said elements in said second array having complementary ordinal correspondence with an element in said first array; and c. means for connecting said first and second outputs of each element of said second array to said first and second outputs of the corresponding bistable element in said first array for setting the corresponding element of said first and second arrays to the same state, said means being comprised solely of a plurality of electrical conductors, each of said first outputs of said first array being connected directly to the first output of the corresponding element in said second array by one of said plurality of electrical conductors, and each of said second outputs of said first array being connected directly to the second output of the corresponding element in said second array by another of said plurality of electrical conductors.

2. The bidirectional logic circuit of claim 1 wherein said first array of bistable elements is connected as a right shift register having zero and one data input terminals and zero and one data output terminals, and said second array of bistable elements is serially connected as a left-shift register having zero and one data input terminals and zero and one data output terminals.

3. The bidirectional logic circuit of claim 2 wherein said right shift register has its zero and one data output terminals connected to its one and zero data input terminals respectively for operation as a switch tail up-counter, and wherein said left-shift register has its zero and one data output terminals connected to its one and zero data input terminals respectively for operation as a down-counter for counting in said second direction.

4. The bidirectional logic circuit of claim 1 wherein said bistable elements of said first array and said bistable elements of said second array are standard JK flip-flops having unbuffered outputs.

5. The bidirectional logic circuit of claim 1 wherein a first shift line is connected to each of said elements of said first array for shifting values in said first array in said first direction, and a second shift line is connected to each of said elements of said second array for shifting values in said second array in said second direction.

6. The bidirectional logic circuit of claim 1 constituting a first bidirectional logic circuit, and further including a second one of said bidirectional logic circuits having the zero and one outputs of one of its elements connected respectively to the zero and one outputs of one of the elements of said first bidirectional logic circuit.

7. The bidirectional logic circuit of claim 1 further including a plurality of said bidirectional logic circuits, each of said plurality of bidirectional logic circuits having the zero and one outputs of one of its elements connected respectively to the zero and one outputs of one of the elements of each of the other bidirectional circuits.